US012205780B2

(12) United States Patent
Gutermuth

(10) Patent No.: US 12,205,780 B2
(45) Date of Patent: Jan. 21, 2025

(54) ACTUATING UNIT FOR AN ELECTRIC SWITCHING ELEMENT

(71) Applicant: ABB AG, Mannheim (DE)

(72) Inventor: Stefan Gutermuth, Hessen (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 17/686,633

(22) Filed: Mar. 4, 2022

(65) Prior Publication Data

US 2022/0285106 A1 Sep. 8, 2022

(30) Foreign Application Priority Data

Mar. 5, 2021 (DE) ........................ 102021105430.3

(51) Int. Cl.

*H01H 1/58* (2006.01)
*H01H 3/02* (2006.01)
*H01H 13/16* (2006.01)
*H01H 13/64* (2006.01)

(52) U.S. Cl.

CPC .......... *H01H 13/16* (2013.01); *H01H 1/5805* (2013.01); *H01H 3/02* (2013.01); *H01H 13/64* (2013.01)

(58) Field of Classification Search

CPC ........ H01H 13/16; H01H 1/5805; H01H 3/02; H01H 13/64; H01H 13/14; H01H 2221/004; H01H 2221/03; H01H 2221/064; H01H 2221/09; H01H 9/02

USPC .......................................................... 307/112

See application file for complete search history.

(56) References Cited

U.S. PATENT DOCUMENTS

2010/0208933 A1* 8/2010 Lee ................... B29C 45/14819 425/577
2014/0203953 A1* 7/2014 Moser ................. G06F 3/04886 341/27
2015/0280708 A1* 10/2015 Goto ...................... H03K 17/98 341/33
2021/0383986 A1* 12/2021 Lai ......................... G01D 5/342

* cited by examiner

*Primary Examiner* — Rexford N Barnie
*Assistant Examiner* — Xuan Ly
(74) *Attorney, Agent, or Firm* — Leydig, Voit & Mayer, Ltd.

(57) ABSTRACT

An actuating unit for an electrical switching element includes an actuating surface for actuating the electrical switching element, which is integrally a part of a surface of a housing for the electrical switching element, and is adapted to be deformed towards an interior of the housing for actuating the electrical switching element; an actuating pin integral with said actuating surface; and mechanically coupled to said actuating surface; and adapted to mechanically couple said actuating surface to said electrical switching element to actuate said electrical switching element; and a limiting pin integral with the actuating surface; and mechanically coupled to the actuating surface; and adapted to limit deformation of the actuating surface.

17 Claims, 4 Drawing Sheets

ACTUATING UNIT FOR AN ELECTRIC SWITCHING ELEMENT

CROSS-REFERENCE TO RELATED APPLICATIONS

This patent application is a convention application claiming priority to German Patent Application No. DE 102021105430.3, filed on Mar. 5, 2021, which is incorporated herein in its entirety by reference.

BACKGROUND OF THE INVENTION

For an actuation of a mechanically actuated electrical switch, a mechanical actuating element is typically used to actuate the electronic switch. Production costs, material costs and assembly costs for such a mechanically actuated electrical switch with an actuating element are subject to a continuous optimization process.

BRIEF SUMMARY OF THE INVENTION

According to aspects of the present disclosure, an actuating unit for an electrical switching element, a switching system and a housing for accommodating an electronic circuit, according to the features of the independent claims is provided. Advantageous embodiments are the subject of the dependent claims and the following description.

According to one aspect, an actuating unit for an electrical switching element is provided, comprising an actuation surface for actuating the electrical switching element, the actuation surface being integrally part of a surface of a housing for the electrical switching element, the actuation surface being adapted to be deformed towards an interior of the housing for actuating the electrical switching element. Further, the actuating unit comprises an actuation pin integrally integrated with the actuation surface and mechanically coupled to the actuation surface and adapted to mechanically couple the actuation surface to the electrical switching element to actuate the electrical switching element. Further, the actuating unit comprises a limiting pin integral with the actuation surface and mechanically coupled to the actuation surface and adapted to limit deformation of the actuation surface.

BRIEF DESCRIPTION OF THE SEVERAL VIEWS OF THE DRAWING(S)

With the following figures, the embodiments are further explained.

Figure 4A:
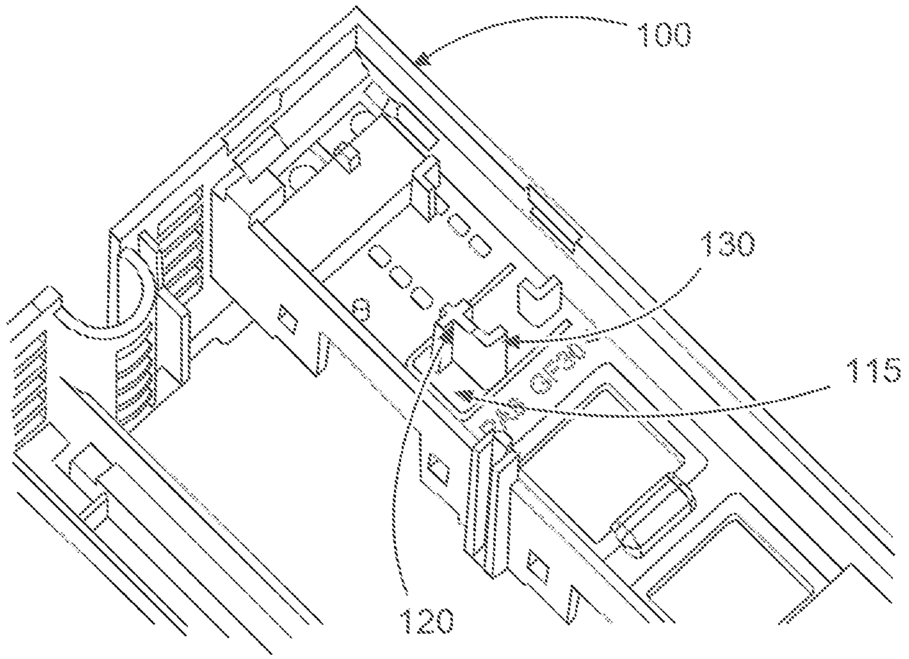
Figure 4B:
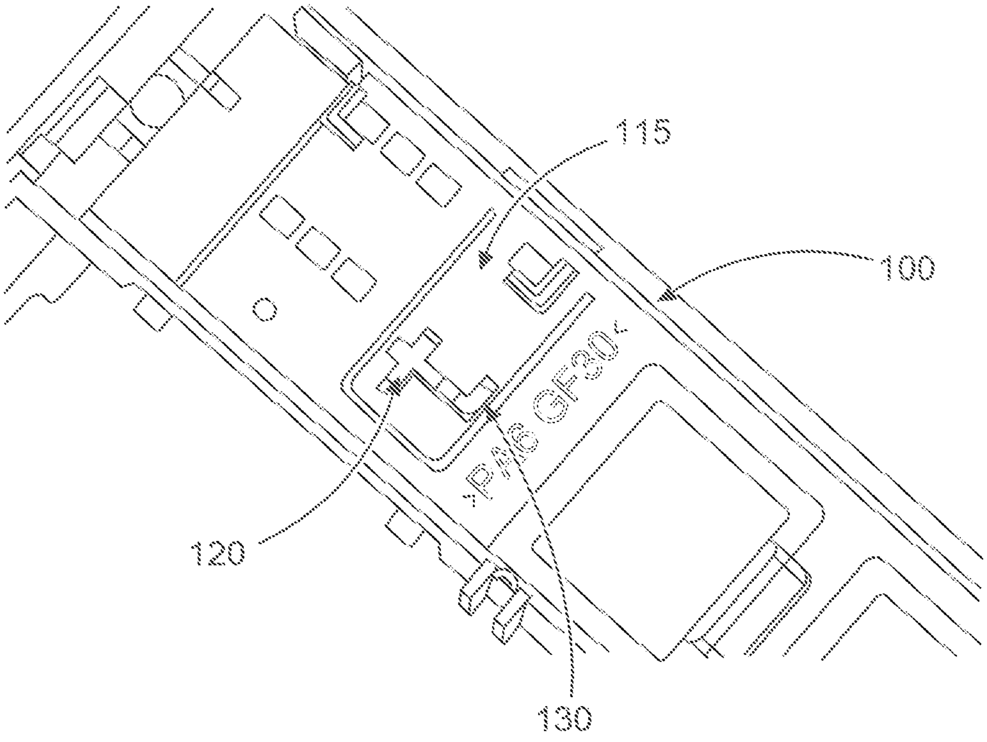

FIGS. 4*a* and 4*b* represent different views of an actuating unit with a pin unit having a superimposed T-shaped and L-shaped cross-sectional profile in accordance with the disclosure.

DETAILED DESCRIPTION OF THE INVENTION

Advantageously, the described actuating unit is integrated in one piece into the housing and can be manufactured directly together with the housing. As a result, both material costs and assembly costs in the production process can be reduced, and the integrated protective element in the form of the limiting pin can both protect the actuating surface against over-bending and protect the electrical switching element against mechanical overload caused by excessive pressure during actuation. There is no need to compromise on functionality and/or ease of use, and high reliability of a system comprising an actuating unit and an electrical switching element can be achieved.

Since the actuating unit can be integrally manufactured with the housing using an injection mold, no other parts are required to provide the actuating unit. In this regard, a minimum force for actuating the actuating surface can be set via a material thickness of an integral connection of the actuating surface to the surface of the housing and/or a material thickness of the actuating surface.

Preferably, the actuating surface is a partially separated portion of the surface of the housing that is only partially integrally connected to the surface of the housing for deformability toward the interior of the housing.

In other words, the actuating surface may be formed by cutting out a portion of a surface of the housing such that there is a connection with the surface of the housing on only one side of the actuating surface, for example, by providing separating cutouts in the surface of the housing when manufacturing the housing with the actuating unit.

Preferably, the actuating unit is arranged to adjust, by means of a material thickness of the housing and/or a material thickness of the integral connection of the actuating surface to the surface of the housing and/or a material thickness of the actuating surface, a minimum force for actuating the actuating surface.

This means that a bending force for actuating the actuating surface can be determined via correspondingly defined material thicknesses.

Preferably, the actuation pin is adapted to be adjacent to the electrical switching element to mechanically couple with the electrical switching element upon deformation of the actuation surface to initiate a switching process of the switching unit when the actuating unit is disposed in the housing comprising the switching unit.

For this purpose, the actuating pin, which can have an extension in the direction of the electrical switching element for actuation, can have a length in this direction which corresponds to the distance between the actuating surface and a triggering surface and/or a trigger of the electrical switching element to such an extent that, when the actuating surface is actuated, the electrical switching element can be triggered after a short idle travel. That is, the adjacency of the actuating pin to the electrical switching element can be both a direct adjacency and an adjacency with an additional idle travel.

Preferably, the limiting pin is arranged to be actuated together with the actuating pin when the actuating surface is deformed and to limit an actuating travel of the actuating pin by the limiting pin hitting an abutment to protect the switching element from further action of the actuating pin.

For this purpose, the limiting pin, which can have an extension in the direction of the electrical switching element for actuation, can have a length in this direction which corresponds to the distance between the actuation surface and a printed circuit board on which the electrical switching element is placed to such an extent that upon actuation of the actuating surface, the electrical switching element can be triggered, if necessary, after a short idle travel and, after actuation of the electrical switching element with an actuating travel, a further actuating travel, of the mechanically coupled actuating pin, is limited by an interaction, in particular an abutment, of the limiting pin with a surface of the printed circuit board.

Particularly preferably, the actuating pin and a part of the limiting pin are directly adjacent to each other.

Advantageously, the actuating pin and the limiting pin can be made to bear against each other to increase corresponding stability.

Preferably, the actuating pin and the limiting pin form a one-piece unit.

The one-piece unit results in a manufacturing advantage and/or a stability advantage for the actuating pin and/or the limiting pin.

Preferably, the actuating unit having a cross-section of a one-piece pin unit comprising the actuating pin and the limiting pin, in a portion of the pin unit, with a superimposed T-shaped and L-shaped profile is arranged to increase a stability of the pin unit during actuation of the actuating unit.

With such a cross-sectional profile, the pin unit can have a higher stability.

Preferably, a length of the limiting pin exceeds a length of the actuating pin, and the actuating pin is arranged and disposed to actuate the electrical switching element when the electrical switching element is disposed in the housing on a printed circuit board; and the limiting pin is arranged and disposed to bear on the printed circuit board as an abutment by means of an extension portion from which the greater length results, to limit further deformation of the actuating surface.

In other words, the limiting pin may bear against a surface of the circuit board to protect the electrical switching element from further actuation.

Preferably, the electrical switching element is a surface mount device, or SMD device, disposed on the printed circuit board in the housing.

By using SMD components for a system consisting of an actuating unit and an electrical switching element, economic costs can be optimized.

Alternatively or additionally, the electrical switching element may be a conventional pushbutton and/or switch. In particular, the electrical switching element may be a wired component, which may in particular be arranged to be electrically contacted by means of a soldering process corresponding to a reflow (THR) technology or a wave soldering (THT) technology.

Preferably, the electrical switching element is a push button and/or a switch.

A switch system comprising an actuating unit described above and an electric switching element is proposed, wherein the electric switching element is arranged in a housing whose surface comprises the actuating unit, and the switching element is arranged and/or arranged to be actuated by means of the actuating unit.

Such a switch system can be manufactured particularly economically.

A housing for housing an electronic circuit having a switching system described above is provided.

A housing for housing an electronic circuit on a printed circuit board with an actuating unit described above is provided.

Figure 1:
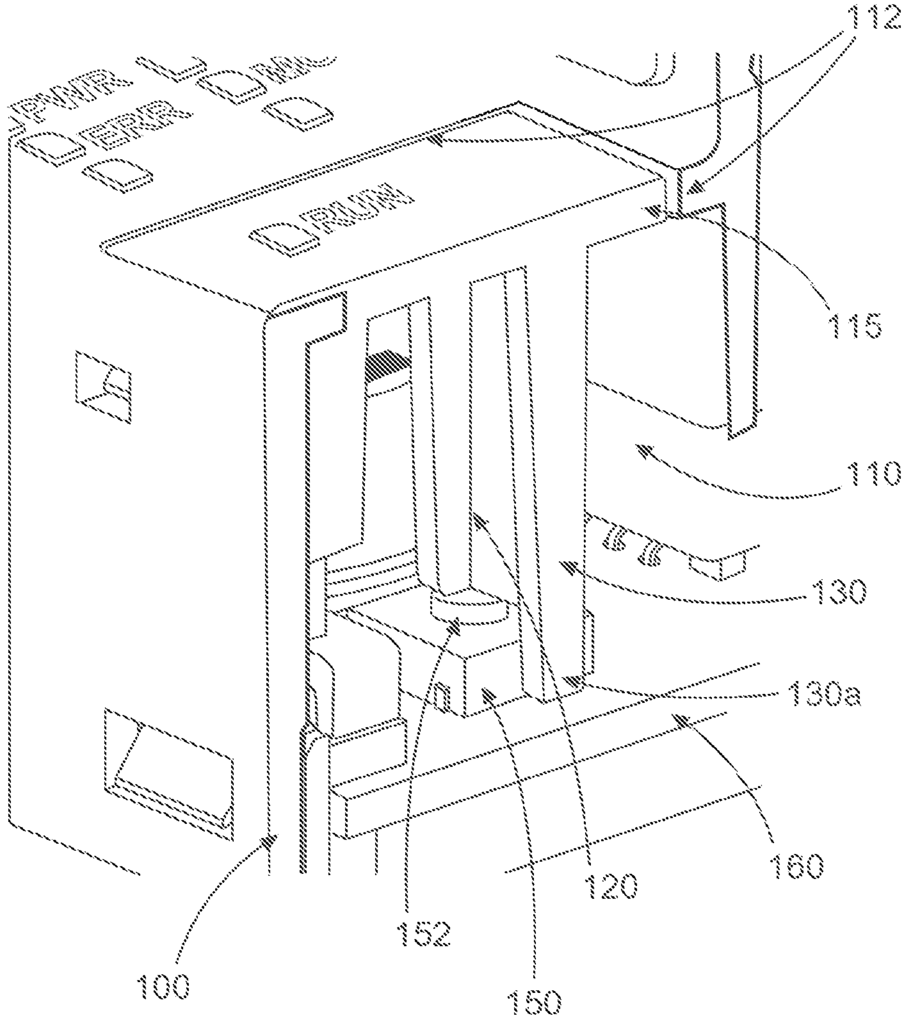
FIG. 1 illustrates a first view of an actuating unit which is an integral part of a housing in accordance with the disclosure.

FIG. 1 schematically illustrates an isometric view of a housing 100 having an actuation assembly 110 for an electrical switching element 150, wherein the electrical switching element 150 is a surface mounted pushbutton arranged on a printed circuit board 160 within the housing 100. In this regard, the electrical switching element 150 may include a mechanical trigger component 152 disposed directly on the electrical switching element 150 and configured to actuate the electrical switching element 150.

The actuating unit 110 for the electrical switching element 150 comprises

- an actuating surface 115 for actuating the electrical switching element 150, which is integrally a part of a surface of a housing 100 for the electrical switching element 150, and is adapted to be deformed toward an interior of the housing 100 for actuating the electrical switching element 150.

Further, the actuating unit 110 comprises an actuation pin 120 integrally integrated with the actuation surface; and mechanically coupled to the actuation surface and adapted to mechanically couple the actuation surface 115 to the electrical switching element 150 to actuate the electrical switching element 150.

The actuation pin 120 of the actuating unit 115 is configured to be adjacent to the electrical switching element 150 to mechanically couple with the electrical switching element 150 upon deformation of the actuation surface 115 to initiate a switching process of the electrical switching element 150 when the actuating unit 110 is disposed within the housing 100 that includes the electrical switching element.

Further, the actuating unit 110 includes a limiting pin 130 integrally integrated with the actuation surface 115 and mechanically coupled to the actuation surface, wherein the limiting pin 130 is configured to limit deformation of the actuation surface 115.

In this regard, the actuating pin 120 is directly adjacent to a portion of the limiting pin 130, substantially transverse to the direction of deformation of the actuating surface.

For limiting the actuation travel of the actuation pin 120, a length of the limiting pin 130 in which the limiting pin 130 extends between the actuation surface toward the circuit board 160 exceeds a length of the actuation pin 120 in which the actuation pin 120 extends toward the electrical switching element 150. The actuation pin 120 is configured and arranged in the housing 100 to actuate the electrical switching element 150 disposed on the circuit board 160. The limiting pin 130 is adapted and arranged to be supported on the circuit board 160 as an abutment by means of an extension portion 130*a*, from which the exceeding length results, to limit further deformation of the actuating surface 115.

Figure 2:
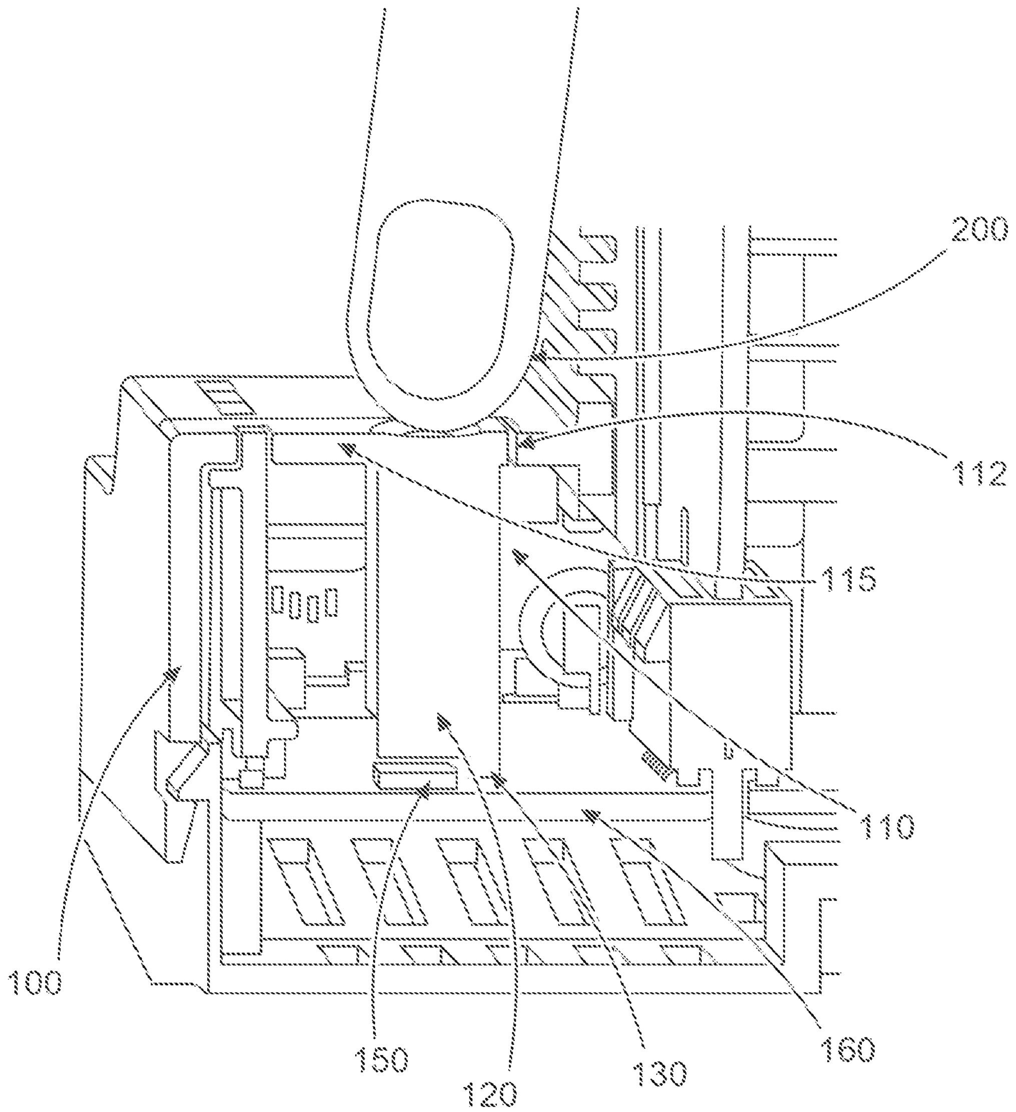
FIG. 2 illustrates a second view of an actuating unit which is an integral part of a housing in accordance with the disclosure.

FIG. 2 corresponds to FIG. 1 and schematically shows an isometric view of the housing 100 with the actuating unit 110 for the electrical switching element 150, wherein the electrical switching element 150 is arranged on a printed circuit board 160 in the housing 100 from a further perspective and indicates how the actuation surface 115 is arranged to be actuated manually 200.

Figure 3:
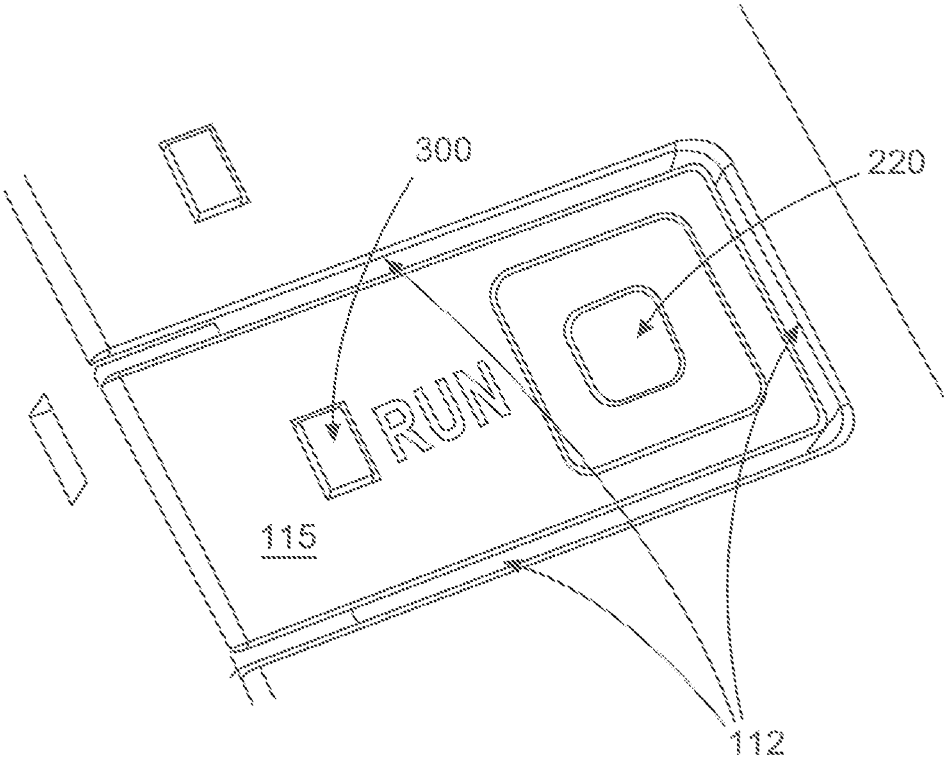
FIG. 3 illustrates an actuating surface which is integrally part of a surface of a housing in accordance with the disclosure.

FIG. 3 schematically illustrates an isometric view of a top view of a portion of the housing 100 having the actuation surface 115, wherein the actuation surface 115 is an at least partially separated portion of the surface of the housing 100 that is only partially integrally connected to the surface of the housing 100 for deformability toward the interior of the housing 100. To separate the actuation surface 115, the surface of the housing 100 includes recesses 112 that separate a portion of a periphery of the actuation surface 115 from the surface of the housing 100. Additionally, the actuation surface 115 may include an actuation recess 220 to enhance manual actuation. Additionally, the actuation surface 115 may include a visual signal surface 300.

FIG. 4*a* and FIG. 4*b* schematically show an isometric view of the actuating unit 110 with a view from an interior of the housing with the actuating unit 110 from different viewing directions.

Thereby, a one-piece pin unit is shown comprising the actuating pin 120 and the limiting pin 130, wherein the pin unit has a cross-section with a superimposed T-shaped profile and L-shaped profile in a portion of the extension from the actuating surface 115 toward the electrical switching element 150, and to increase stability of the pin unit during actuation of the actuating unit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuating unit for an electric switching element, comprising:

an actuating surface, the actuating surface configured to actuate the electrical switching element, the actuating surface being integrated, using an injection mold, to a surface of a housing for the electrical switching element, and being configured to be deformed towards an interior of the housing for actuating the electrical switching element;

an actuating pin that is integrated, using the injection mold, to the actuating surface and mechanically coupled to the actuating surface, the actuating pin being configured to mechanically couple the actuating surface to the electrical switching element so as to actuate the electrical switching element; and a limiting pin that is integrated, using the injection mold, to the actuating surface and mechanically coupled to the actuating surface, the limiting pin being configured to limit deformation of the actuating surface.

2. The actuating unit of claim 1, wherein the actuating surface is a partially separated part of the surface of the housing and is only partially integrally connected to the surface of the housing for deformability towards the interior of the housing.

3. The actuating unit of claim 1, wherein a minimum force for actuating the actuating surface is adjustable based on at least one of: a material thickness of the housing, a material thickness of the integrated connection of the actuating surface to the surface of the housing, and a material thickness of the actuating surface.

4. The actuating unit of claim 1, wherein the actuation pin is configured to abut the electrical switching element to mechanically couple with the electrical switching element upon deformation of the actuation surface to initiate a switching process of the electrical switching element when the actuating unit is arranged in the housing comprising the electrical switching element.

5. The actuating unit of claim 1, wherein the limiting pin is configured to be actuated together with the actuation pin upon deformation of the actuation surface, and wherein the limiting pin is configured to limit an actuation travel of the actuation pin by having the limiting pin meet an abutment to protect the electrical switching element from further engagement of the actuation pin.

6. The actuating unit of claim 1, wherein the actuating pin and a portion of the limiting pin are directly adjacent to one another.

7. The actuating unit of claim 1, wherein the actuating pin and the limiting pin form an integral unit.

8. The actuating unit of claim 1, wherein a cross-section of a one-piece pin unit comprising the actuating pin and the limiting pin, in a portion of the pin unit having a superimposed T-shaped profile and L-shaped profile, is configured to increase stability of the pin unit upon actuation of the actuating unit.

9. The actuating unit of claim 1, wherein a length of the limiting pin exceeds a length of the actuating pin, and the actuating pin is configured and arranged, when the electrical switching element is arranged in the housing on a printed circuit board, to actuate the electrical switching element, and wherein the limiting pin is configured and arranged to be supported on the circuit board as an abutment by means of an extension portion resulting in the excess length to limit further deformation of the actuating surface.

10. The actuating unit of claim 9, wherein the electrical switching element is a surface mounted component arranged on the printed circuit board in the housing.

11. The actuating unit of claim 1, wherein the electrical switching element is a push button and/or a switch.

12. A switch system, comprising:

an electrical switching element arranged in a housing, wherein a surface of the housing comprises an actuating unit, and wherein the electrical switching element is configured to be actuated by the actuating unit, the actuating unit comprising:

an actuating surface, the actuating surface configured to actuate the electrical switching element, the actuating surface being integrated, using an injection mold, to the surface of the housing for the electrical switching element, and being configured to be deformed towards an interior of the housing for actuating the electrical switching element;

an actuating pin that is integrated, using the injection mold, to the actuating surface and mechanically coupled to the actuating surface, the actuating pin being configured to mechanically couple the actuating surface to the electrical switching element so as to actuate the electrical switching element; and a limiting pin that is integrated, using the injection mold, to the actuating surface and mechanically coupled to the actuating surface, the limiting pin being configured to limit deformation of the actuating surface.

13. A method for actuating an electrical switching element arranged in a housing, the method comprising:

providing the electrical switching element arranged in the housing, wherein a surface of the housing comprises an actuating unit, and wherein the electrical switching element is configured to be actuated by the actuating unit, the actuating unit comprising:

an actuating surface, the actuating surface configured to actuate the electrical switching element, the actuating surface being integrated, using an injection mold, to the surface of the housing for the electrical switching element, and being configured to be deformed towards an interior of the housing for actuating the electrical switching element;

an actuating pin that is integrated, using the injection mold, to the actuating surface and mechanically coupled to the actuating surface, the actuating pin being configured to mechanically couple the actuating surface to the electrical switching element so as to actuate the electrical switching element; and a limiting pin that is integrated, using the injection mold, to the actuating surface and mechanically coupled to the actuating surface, the limiting pin being configured to limit deformation of the actuating surface.

14. The actuating unit of claim 1, wherein the actuating unit and the housing are part of a single piece.

15. The actuating unit of claim 1, wherein the actuating surface is integrally connected to the surface of the housing.

16. The actuating unit of claim 1, wherein the actuating surface is configured to be deformed within the interior of the housing.

17. The actuating unit of claim 1, wherein the actuating unit is integrally formed with the housing unit using an injection mold.

* * * * *